us006892421B2

United States Patent
Cooper et al.

(10) Patent No.: US 6,892,421 B2
(45) Date of Patent: May 17, 2005

(54) OBLIQUE ANGLED SUSPENSION CASTER FORK FOR WHEELCHAIRS

(75) Inventors: Rory A. Cooper, Gibsonia, PA (US); William Ammer, Allison Park, PA (US); Mark McCartney, Saxonburg, PA (US); Corey Blauch, Wilkes-Barre, PA (US)

(73) Assignee: The United States of America as represented by the Department of Veterans Affairs, Washington, DC (US)

( * ) Notice: Subject to any disclaimer, the term of this patent is extended or adjusted under 35 U.S.C. 154(b) by 145 days.

(21) Appl. No.: 10/316,087

(22) Filed: Dec. 11, 2002

(65) Prior Publication Data

US 2004/0111830 A1 Jun. 17, 2004

(51) Int. Cl.[7] .............................................. B60B 33/00
(52) U.S. Cl. ............................ 16/44; 16/35 D; 16/18 A
(58) Field of Search ........................ 16/44, 35 D, 18 R, 16/42 T, 18 A; D8/375; 188/166, 376; 267/257, 292

(56) References Cited

U.S. PATENT DOCUMENTS

| | | | |
|---|---|---|---|
| 1,745,992 A | | 2/1930 | Herold |
| 2,271,304 A | * | 1/1942 | Mulholland .................... 16/44 |
| 2,472,686 A | | 6/1949 | Snyder |
| 2,494,019 A | * | 1/1950 | Ware, Jr. ................. 280/11.28 |
| 2,707,795 A | | 5/1955 | Skupas |
| 2,738,542 A | | 3/1956 | Clark, Jr. |
| 2,830,545 A | | 4/1958 | Robinson et al. |
| 3,174,176 A | * | 3/1965 | Olson ......................... 16/35 R |
| 4,312,096 A | | 1/1982 | Schubert et al. |
| 4,346,498 A | | 8/1982 | Welsch et al. |
| 4,462,138 A | | 7/1984 | Black |
| 4,485,521 A | | 12/1984 | Welsch et al. |
| 4,559,669 A | | 12/1985 | Bonzer et al. |
| 5,305,496 A | * | 4/1994 | Gagnon et al. ................. 16/44 |
| 5,347,680 A | | 9/1994 | Rippe |
| 5,394,589 A | | 3/1995 | Braeger et al. |
| 5,400,469 A | | 3/1995 | Simonsen |
| 5,448,796 A | | 9/1995 | Larson |
| 5,899,475 A | * | 5/1999 | Verhaeg et al. .......... 280/250.1 |
| 6,149,169 A | | 11/2000 | Chelgren |
| 6,279,199 B1 | | 8/2001 | Plate |
| 6,409,196 B1 | | 6/2002 | McFarland |
| 6,425,161 B1 | | 7/2002 | LeMeur, Jr. et al. |
| 6,499,184 B2 | * | 12/2002 | Plate ............................. 16/44 |
| 6,532,623 B1 | * | 3/2003 | Watanabe .................. 16/35 D |
| 6,568,030 B1 | * | 5/2003 | Watanabe et al. ............... 16/44 |

FOREIGN PATENT DOCUMENTS

| | | | |
|---|---|---|---|
| JP | 52-051641 | | 4/1977 |
| JP | 2001-180207 | * | 7/2001 |

* cited by examiner

Primary Examiner—Robert J. Sandy
Assistant Examiner—Andre' L. Jackson
(74) Attorney, Agent, or Firm—Dykema Gossett PLLC

(57) ABSTRACT

A shock absorption mechanism for a wheelchair includes a caster fork including a first oblique surface and a second horizontally disposed surface, relative to a horizontal plane of travel of the wheelchair. A portion of the second surface includes a curved profile. A joint is mountable adjacent a first section thereof to a frame of the wheelchair and adjacent a second section thereof to the caster fork. The joint includes a first oblique surface and a second surface for guiding reciprocation of the curved profile portion of the caster fork. A shock absorber is disposed in an oblique orientation between the first oblique surface of the caster fork and the first oblique surface of the joint. The caster fork is pivotable adjacent the second section of the joint. The shock absorber is compressable in a direction generally parallel to the oblique orientation thereof during pivoting of the caster fork.

20 Claims, 6 Drawing Sheets

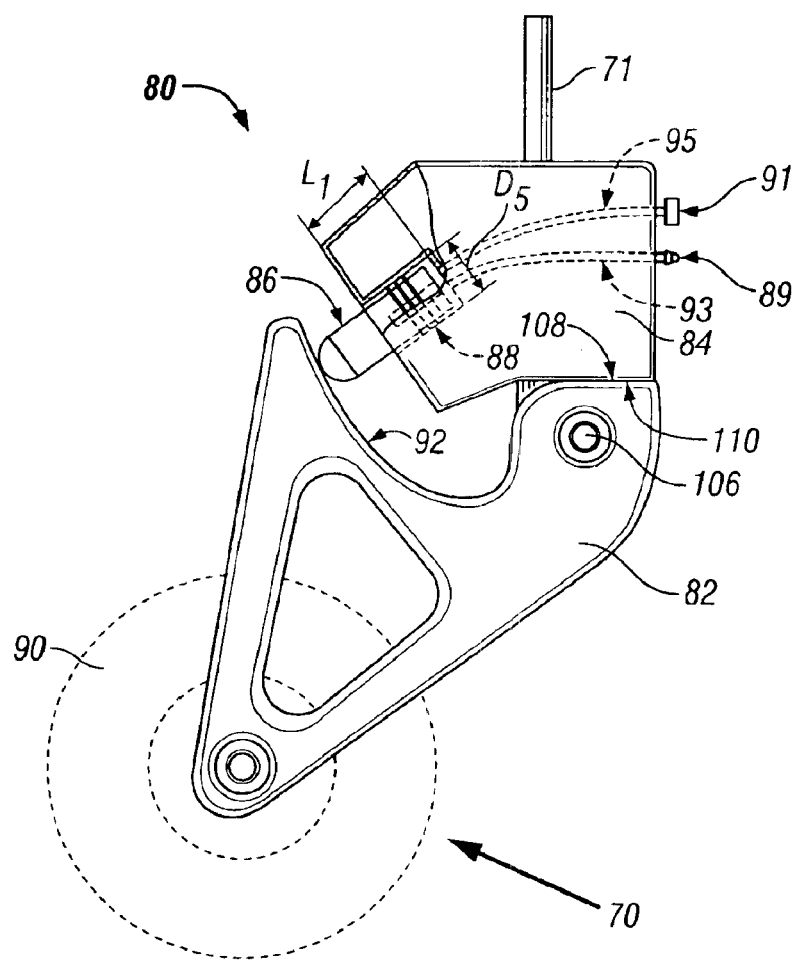
FIG. 8
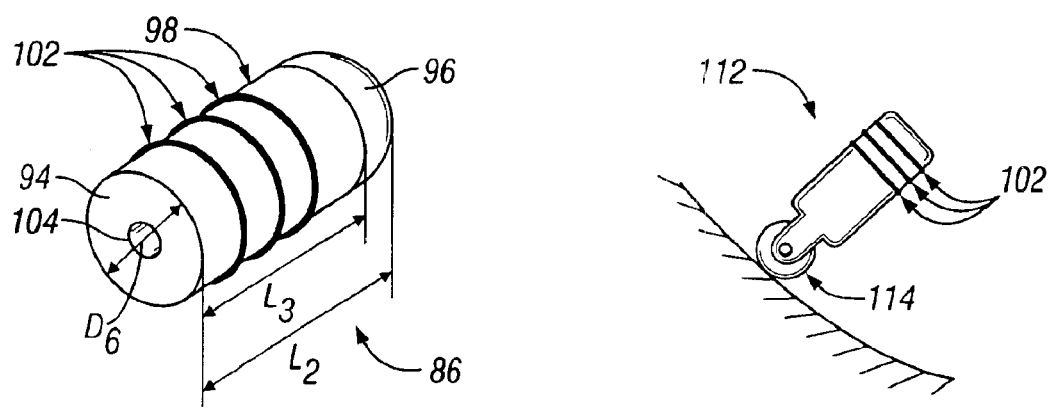
FIG. 9   FIG. 10

US 6,892,421 B2

OBLIQUE ANGLED SUSPENSION CASTER FORK FOR WHEELCHAIRS

RELATED APPLICATIONS

This application claims benefit of priorty of Provisional Application Ser. No. 60/338,577, filed Dec. 11, 2001.

BACKGROUND OF INVENTION a. Field of Invention

The invention relates generally to shock absorption, and, more particularly to an improved apparatus and method for the absorption of horizontal and vertical impact forces in a wheelchair during travel over rough or uneven surfaces.

b. Description of Related Art

Wheelchairs include various components which are subject to high impact forces that directly affect wheelchair comfort and durability. In order to improve wheelchair ride and comfort, and to avoid secondary injuries due to extended wheelchair use, wheelchair components must be designed to eliminate or reduce the effect of such impact forces. Common secondary injuries due to extended wheelchair use include, for example, musculoskeletal injuries such as herniated discs, spinal deformities and chronic low back pain, as well as neurological injuries. Additionally, common wheelchair component durability issues include premature wheelchair frame deterioration, or complete component failure due to fatigue.

When traveling over obstacles, the impact forces described above are generally transferred through the wheels and caster fork, through the frame, through the seat cushion and to the body of a user. Typical impact forces, such as forces generated by wheels traveling over a rough surface, include both horizontal and vertical force components relative to the travel surface. Accordingly, one area of specific concern is wheelchair caster forks, which experience both the horizontal and vertical impact forces through the wheels during wheelchair travel over rough surfaces.

In an effort to reduce impact forces, conventional wheelchair designs have included caster fork designs including vertical shock absorbers for shock absorption perpendicular to the travel surface. Likewise, caster forks have been designed to include horizontal shock absorbers for shock absorption parallel to the travel surface. In order to target both vertical and horizontal impact forces, it is apparent that caster forks can be designed with both vertical and horizontal shock absorbers. However, such caster fork designs have thus far had drawbacks related to functionality, efficiency, durability and aesthetics.

In the art, there presently exist conventional casters for targeting both vertical and horizontal impact forces, as disclosed in U.S. Pat. No. 1,745,992 to Herold and U.S. Pat. No. 6,149,169 to Chelgren.

U.S. Pat. No. 1,745,992 to Herold discloses a mechanism that employs a resilient rubber block for shock absorption of both vertical and horizontal impact forces. Herold however does not address shock absorption for wheelchair and other related applications, in which the impact forces are relatively large in the vertical and horizontal directions. Moreover, the rubber block for Herold only absorbs a fraction of the entire vertical and horizontal impact forces, and is inefficient in absorbing and targeting the entire component of such forces. Likewise, U.S. Pat. No. 6,149,169 to Chelgren discloses a caster fork design for shock absorption of both vertical and horizontal impact forces. As for Herold, the shock absorption mechanism for Chelgren also does not effectively absorb or target the entire component of the vertical and horizontal impact forces.

For the U.S. patents cited above, from a design and effectiveness standpoint, the design of the shock absorption mechanisms described above has left a need for improvements for effectively targeting and absorbing the entire component of the vertical and horizontal impact forces. From an assembly standpoint, the assembly and installation of complex shock absorption systems can be time-consuming and burdensome, and can further add to the overall cost of the end-product. Lastly, from a maintenance and use standpoint, improvements in conventional shock absorption systems would likewise provide improvements in the durability of wheelchairs and other such devices.

SUMMARY OF INVENTION

The invention solves the problems, and overcomes the drawbacks and disadvantages of the prior art shock absorption systems by providing a shock absorber design which effectively targets virtually the entire component of vertical and horizontal impact forces.

Thus, an aspect of the present invention is to provide a shock absorption system which effectively targets virtually the entire component of vertical and horizontal impact forces without resorting to multiple shock absorption components for individually targeting such impact forces.

Another aspect of the present invention is to provide a caster fork which is highly durable throughout the life of a wheelchair or other such devices on which it is installed.

Yet another aspect of the present invention is to provide an elastomeric or pneumatic shock absorber which can efficiently and effectively absorb impact forces for a wide range of users and purposes.

Another aspect of the present invention is to provide a shock absorption system which is easy to manufacture and install, and relatively inexpensive.

The invention accomplishes these aspects by providing a shock absorption mechanism usable in a wheelchair. The mechanism may include a caster fork having a first oblique surface and a second surface. Each of the surfaces of the caster fork may be disposed at first and second angles, respectively, relative to a generally horizontal plane of travel of the wheelchair. A portion of the second surface may include a generally curved profile. A joint may be mounted adjacent a first section thereof to a frame of the wheelchair and adjacent a second section thereof to the caster fork. The joint may include a first oblique surface relative to the generally horizontal plane of travel of the wheelchair. The joint may further include a second generally flat surface for guiding reciprocation of the generally curved profile portion of the caster fork. A shock absorber may be mounted between the first oblique surface of the caster fork and the first oblique surface of the joint. The shock absorber may be disposed in an oblique orientation relative to the generally horizontal plane of travel of the wheelchair. The caster fork may be pivotable in a predetermined direction adjacent the second section of the joint, when mounted adjacent the second section of the joint. The shock absorber may be compressable in a direction generally parallel to the oblique orientation thereof during pivoting of the caster fork, when mounted between the first oblique surface of the caster fork and the first oblique surface of the joint.

For the mechanism described above, the entire second surface of the caster fork may be formed of a generally curved profile. For the caster fork, the first angle may be greater than approximately 1° and less than approximately 89° relative to the generally horizontal plane of travel of the wheelchair. The first angle may preferably be approximately 45° relative to the generally horizontal plane of travel of the wheelchair. For the caster fork, the second surface may be disposed generally parallel relative to the generally horizontal plane of travel of the wheelchair. Alternatively, the second angle may be greater than approximately 1° relative to the generally horizontal plane of travel of the wheelchair. When the caster fork is mounted to the joint, the first oblique surface of the caster fork may be disposed generally parallel to the first oblique surface of the joint. When the shock absorber is mounted between the caster fork and the joint, the shock absorber may be disposed generally orthogonal relative to the first oblique surface of the caster fork. Alternatively, when the shock absorber is mounted between the caster fork and the joint, the shock absorber may be disposed at a predetermined angle relative to the first oblique surface of the caster fork. The caster fork may include a cutout therein for affixation of a wheelchair wheel. The cutout may be defined by two mirror-image extensions between which the wheelchair wheel is affixable. The caster fork may include a further cutout therethrough for weight reduction. The joint may include a protrusion for insertion within a cutout in the caster fork. The cutout in the caster fork may be defined by two mirror-image extensions between which the protrusion of the joint is insertable. The shock absorber may include a generally circular, elliptical, polygonal, "barrel" shaped, or hollow cross section. The shock absorber may be made of polyurethane elastomer. The caster fork and the joint may be made of metal, such as steel, aluminum, titanium, or from plastic, ceramic or composites.

The invention further provides a method of absorbing impact shocks for a wheelchair. The method includes the step of providing a caster fork including a first oblique surface and a second surface. Each of the surfaces of the caster fork may be disposed at first and second angles, respectively, relative to a generally horizontal plane of travel of the wheelchair. A portion of the second surface may include a generally curved profile. The invention may further include the step of mounting a joint adjacent a first section thereof to a frame of the wheelchair and adjacent a second section thereof to the caster fork. The joint may include a first oblique surface relative to the generally horizontal plane of travel of the wheelchair, and a second generally flat surface for guiding reciprocation of the generally curved profile portion of the caster fork. The invention may further include the step of mounting a shock absorber, in an oblique orientation relative to the generally horizontal plane of travel of the wheelchair, between the first oblique surface of the caster fork and the first oblique surface of the joint. When the caster fork pivots adjacent the second section of the joint, the shock absorber may compress in a direction generally parallel to the oblique orientation thereof.

The invention yet further provides a shock absorption mechanism usable in a wheelchair. The mechanism may include a caster fork including a first generally oblique surface and a second surface. Each of the surfaces may be disposed at first and second angles, respectively, relative to a generally horizontal plane of travel of the wheelchair. A portion of the second surface may include a generally curved profile. A joint may be mounted adjacent a first section thereof to a frame of the wheelchair and adjacent a second section thereof to the caster fork. The joint may include a first oblique surface relative to the generally horizontal plane of travel of the wheelchair, and may further include a second generally flat surface for guiding reciprocation of the generally curved profile portion of the caster fork. A cylinder may be provided in the joint and may have a central axis disposed generally orthogonal to the first oblique surface of the joint. The cylinder may have a first open end and a second end having a passage for supplying air from an air filler valve to the cylinder. A piston may be disposable within the cylinder. The piston may have a first section disposed within the cylinder and a second exposed section protruding through the first open end of the cylinder. The first section may include o-rings for providing sealing contact between the piston and the cylinder so as to prevent air from exiting the cylinder adjacent the piston. The caster fork may be pivotable in a predetermined direction adjacent the second section of the joint when mounted adjacent the second section of the joint. The piston may be movable within the cylinder during pivoting of the caster fork when disposed within the cylinder. Air pressure within the cylinder may be adjustable to limit movement of the piston. An air pressure gauge for monitoring air pressure within the cylinder may also be provided.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings:

FIG. 8 is an assembled view of a second embodiment of a shock absorption mechanism according to the present invention, including a wheel (shown in phantom) installed thereon, and including a cutout illustrating the cylinder and piston arrangement thereof;

FIG. 9 is an illustrative view of the piston for the second embodiment of the shock absorption mechanism of FIG. 8; and FIG. 10 is an alternative embodiment of piston of FIG. 9.

DETAILED DESCRIPTION OF THE PREFERRED EMBODIMENT

Figure 1A:
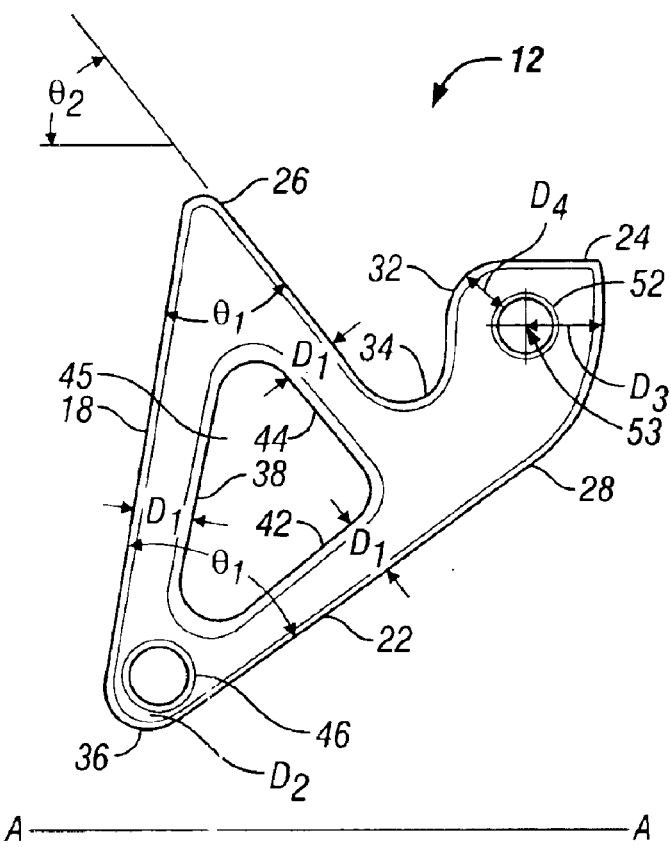
FIG. 1A is a front view of a caster fork according to the present invention.
Figure 1B:
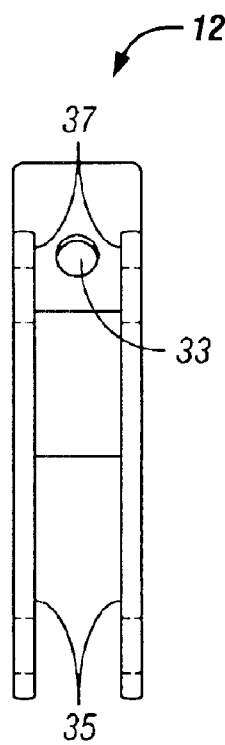
FIG. 1B is a right side view of the caster fork of FIG. 1A.
Figure 1C:
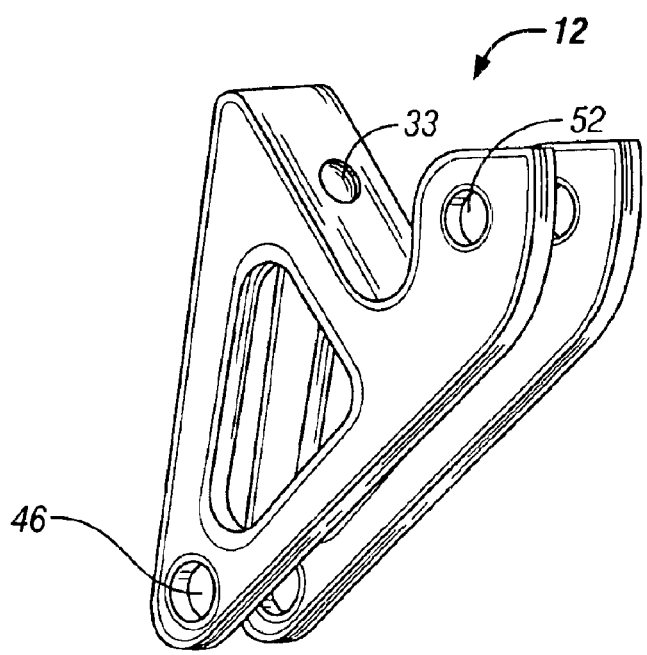
FIG. 1C is a perspective view of the caster fork of FIG. 1A.
Figure 2B:
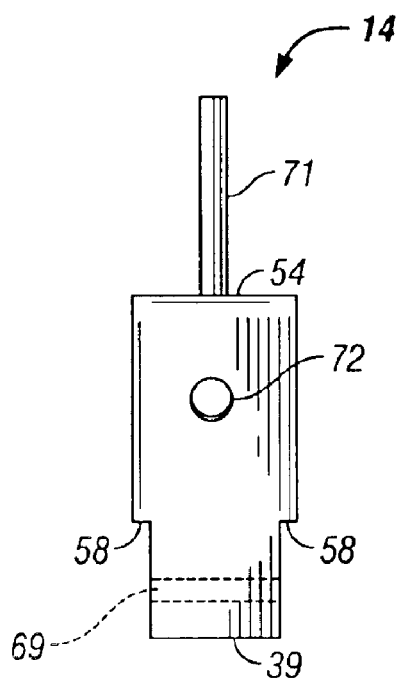
FIG. 2B is a left side view of the joint of FIG. 2A.
Figure 2A:
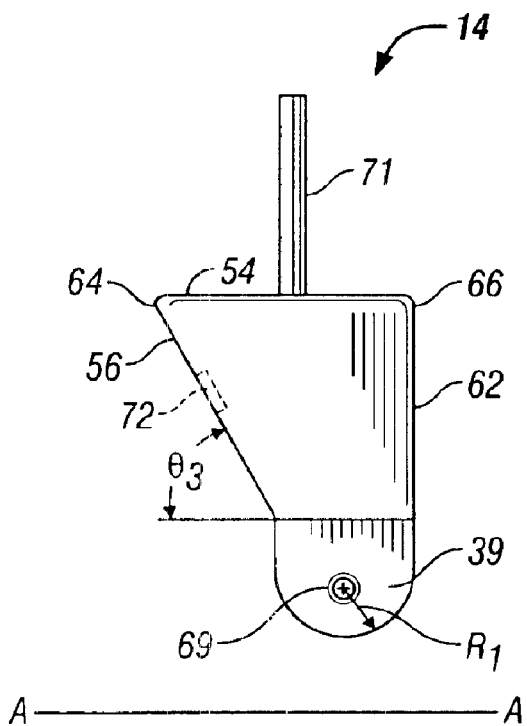
FIG. 2A is a front view of a joint according to the present invention.
Figure 2C:
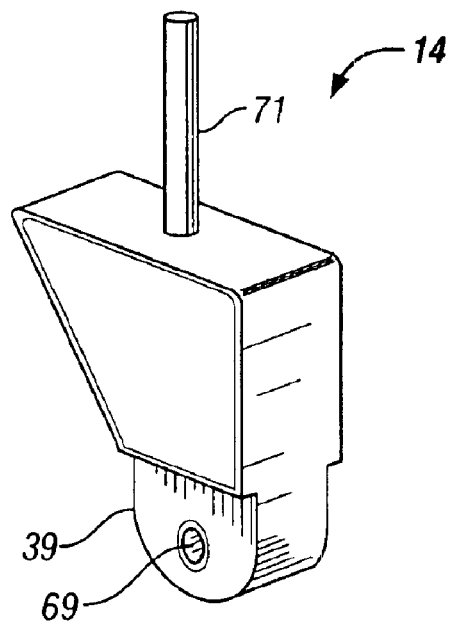
FIG. 2C is a perspective view of the joint of FIG. 2A.

Referring now to the drawings wherein like reference numerals designate corresponding parts throughout the several views, FIGS. 1A–4 illustrate a first embodiment of a shock absorption mechanism according to the present invention, generally designated 10. Shock absorption mechanism 10 may generally include a caster fork 12, a joint 14 and a shock absorber 16.

Referring to FIGS. 1A–1C and 4, caster fork 12 may include first through fourth generally flat surfaces 18, 22, 24 and 26, respectively. It is foreseeable that surfaces 18, 22, 24 and 26 may be curved. In the orientation of shock absorption mechanism 10 of FIG. 4, surface 24 is oriented generally parallel to a generally horizontal plane-A of travel for wheel 20 affixed to a wheelchair (not shown). Alternatively, it is foreseeable that surface 24 may be disposed in an oblique configuration relative to generally horizontal plane-A. Surface 18 may be oriented at a generally acute angle $\theta_1$ relative to surfaces 22 and 26. Likewise, surface 26 may be oriented at a generally acute angle $\theta_2$ relative to the generally horizontal plane-A of travel for wheel 20. Angle $\theta_2$ may be greater than 1° and less than 89°, such that surface 26 is disposed in an oblique configuration relative to the generally horizontal plane-A of travel for wheel 20. Preferably, angle $\theta_2$ may be approximately 45°, but could be varied, as would be apparent to a skilled artisan.

Caster fork 12 may further include first through fourth curved surfaces 28, 32, 34 and 36, respectively. Fifth through seventh generally flat surfaces 38, 42 and 44, respectively, may be provided at a predetermined distance $D_1$ and oriented generally parallel to first, second and fourth surfaces 18, 22 and 26, respectively, so as to form a cutout 45 for reducing the weight of caster fork 12. Distance $D_1$ may be determined experimentally or by performing stress analysis on caster fork 12 under the impact conditions discussed in greater detail below. It is foreseeable that distance $D_1$ may be uniform, as shown in FIG. 1A, or may vary as needed, as would be apparent to a skilled artisan.

A circular indentation 33 may be provided on surface 26 of caster fork 12 for insertion and frictional retention of shock absorber 16 therein. A hole 46 may be provided adjacent curved surface 36 for attachment of wheel 20 to caster fork 12 by means of a bolt (now shown) or the like. Mirror image extensions 35 may be provided for insertion of wheel 20 therebetween and attachment to caster fork 12 at hole 46. A hole 52 may be provided adjacent flat surface 24 for attachment of caster fork 12 to protrusion 39 of joint 14. Specifically, mirror image extensions 37 may be provided for insertion of a protrusion 39 (described below) on joint 14 and a bolt (not shown) may be used to attach joint 14 to caster fork 12. Upon attachment to joint 14, caster fork 12 may pivot relative to joint 14 about pivot point 53. Specifically, as described in greater detail below, curved surface 32 of caster fork 12 may be disposed adjacent flat surfaces 58 of joint 14, and may further reciprocate relative to flat surfaces 58. The reciprocation of curved surface 32 relative to flat surfaces 58 would therefore allow caster fork 12 to rotate relative to joint 14 in a predefined manner. Hole 46 may be located at a radial distance $D_2$ from curved surface 36, and hole 52 may be located at radial distances $D_3$ and $D_4$ from surfaces 28 and 32, respectively. Radial distances $D_2$–$D_4$ may be determined experimentally or by performing stress analysis on caster fork 12 under the impact conditions discussed in greater detail below.

Caster fork 12 may be constructed of rigid metals such as steel, aluminum or titanium, or may instead be constructed of plastic or ceramic materials of suitable rigidity.

Referring to FIGS. 2A–2C and 4, joint 14 may include first through fourth generally flat surfaces 54, 56, 58 and 62, respectively. Rounded surfaces 64 and 66 may be provided at the intersection of surfaces 54 and 56, and 54 and 62, respectively. Surface 56 may be oriented at a generally acute angle $\theta_3$ relative to the generally horizontal plane-A of travel for wheel 20. In the assembled configuration of FIG. 4, surface 56 of joint 14 is disposed in a generally parallel configuration relative to surface 26 of caster fork 12. Accordingly, angle $\theta_3$ is approximately the same as angle $\theta_2$. It is foreseeable however that angles $\theta_2$ and $\theta_3$ may be made different from each other, so long as shock absorber 16 is positioned in an oblique configuration.

A protrusion 39 may be provided on joint 14 for insertion between mirror image extensions 37 of caster fork 12. Protrusion 39 may have a semi-circular profile, with a radius $R_1$, to allow caster fork 12 to freely pivot relative to joint 14 when attached thereto. A bolt (not shown) or the like may be used to connect joint 14 to caster fork 12. A circular indentation 72 may be provided on surface 56 of joint 14 for insertion and frictional retention of shock absorber 16 therein. A hole 69 may be provided in protrusion 39 for insertion of a bolt (not shown) and for connection of joint 14 to caster fork 12.

A rod 71 may be disposed within a threaded hole (not shown) on surface 54 of joint 14. Rod 71 may include a complementary threaded end for engagement with the threaded hole on surface 54. It is foreseeable that rod 71 may be formed with joint 14, instead of being separately affixed thereto, as would be apparent to a skilled artisan. Rod 71 may be inserted into a complementary receptacle (now shown) in a wheelchair to affix shock absorption mechanism 10 to the wheelchair.

Figure 3:
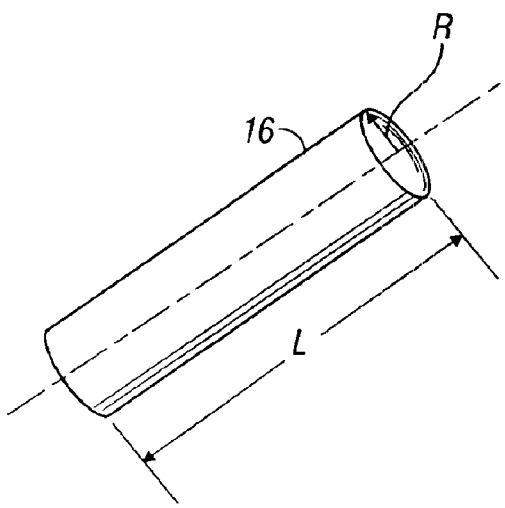
FIG. 3 is a perspective view of a shock absorber according to the present invention.

Referring to FIG. 3, shock absorber 16 having a length L and a radius R may be inserted within indentations 33 and 72 of caster fork 12 and joint 14, respectively. Alternatively, it is foreseeable that shock absorber 16 may be affixed to surfaces 26 and 56 of caster fork 12 and joint 14, respectively, by other suitable means such as adhesive or a fastener means (not shown). Compared to the circular shock absorber 16 shown in FIG. 3, it is foreseeable that shock absorber 16 may include a generally elliptical or polygonal cross section.

It is apparent shock absorber 16 may be a conventional spring and/or pneumatic shock absorber, or may be a shock absorber made of a polyurethane elastomer of suitable hardness.

Conventional springs and rubber materials are widely used as shock absorbers for a variety of applications. Springs, which have been used for wheelchair type applications, generally provide little dampening of impact shocks and persist in period motion (i.e. dolphining) for several cycles until they reach an equilibrium state and stop cycling. Rubber as a shock absorber may be adequate for dampening impact shocks, but lacks the long-term durability required in the industry for wheelchair casters.

In order to overcome the drawbacks of conventional spring and rubber shock absorbers, polyurethane based shock absorbers have been designed and tested herewith.

Polyurethane is a linear elastic material when exposed to compression loads, and has greater energy absorption than similar rubbers and plastics. Polyurethane also has the ability to support heavy loads with minimum deflection, and has the ability to recover completely after being loaded. Compared to rubber shock absorbers, polyurethane is virtually unaffected by common outdoor temperatures.

Accordingly, shock absorber 16 may be a conventional spring and/or pneumatic shock absorber, but is preferably a shock absorber made of a polyurethane elastomer of suitable hardness.

In order to determine the diameter and material properties of shock absorber 16, the stress and strain properties on shock absorber 16 may be evaluated for a wide range of wheelchair loads. Such shock absorber parameters may be determined by performing standard curb drop and double drum tests on wheelchairs for evaluating the effect of fatigue thereon, as governed by International Standards Organization (ISO) standards.

Specifically, the ISO specified combination of double drum cycles and curb drops represent three to five years of typical wheelchair use. The double drum test is used to simulate sidewalk cracks, door thresholds, and other road hazards. In a standard double drum test, a wheelchair may be loaded with an appropriate wheelchair test dummy. The machine used for the double drum test consists of two horizontal metal cylindrical drums, disposed in a parallel configuration. Each drum has two 2 cm. slats attached 180° apart. One drum is designated a reference drum. The back wheels of the wheelchair are placed on the reference drum and the front wheels on the other drum. The wheelchair is restrained so that longitudinal movements are not possible. Vertical movements however remains unrestrained. A double drum cycle is defined as one revolution of the reference roller. The test is performed until the reference drum has completed 200,000 revolutions. If failure of a wheelchair occurs before completion of the designated revolutions, the failure is evaluated to determine whether a test can continue (i.e. in the case of a minor failure), or the test is halted (i.e. in the case of a major failure).

Compared to the double drum test, the curb drop test discussed above is used to simulate the repeated occurrence of wheelchairs descending down small curbs. For the test, a curb drop machine lifts the wheelchair as though it is on a horizontal plane. The chair is then dropped 50±5 mm on to a rigid horizontal plane. This dropping simulates going off curbs and other large bumps. For the curb drop test, a wheelchair is restrained to restrict horizontal movement only. The test is run for 6,666 cycles. As for the double drum test, if failure of a wheelchair occurs before completion of the designated cycles, the failure is evaluated to determine whether a test can continue (i.e. in the case of a minor failure), or the test is halted (i.e. in the case of a major failure).

Based upon studies done on road loads acting on wheelchairs, using ISO fatigue tests of curb drop and double drum, it has been determined herewith that casters must be able to withstand impact forces up to approximately 940 Newtons, and are subjected to consistent forces up to approximately 630 Newtons. Horizontally (i.e. from the front to the back of a wheelchair), casters may be subject to frequent forces of approximately 440 Newtons on the double drum and impact forces of approximately 220 Newtons on the curb drop. Accordingly, a shock absorber must be able to effectively, as well as efficiently, dissipate shock of such impact forces in both the vertical and horizontal directions.

For the testing performed herewith on polyurethane based shock absorbers (and oil/pneumatic shock absorbers), a variety of polyurethane shock absorbers having hardness in the range of 40–80 A for wheelchair loads of 100 kg were tested. Based upon the evaluation of polyurethane based shock absorbers, it has been determined herewith that polyurethane shock absorbers provide adequate dampening, minimal deflection and superior durability, compared to conventional spring or rubber based dampers.

Figure 4:
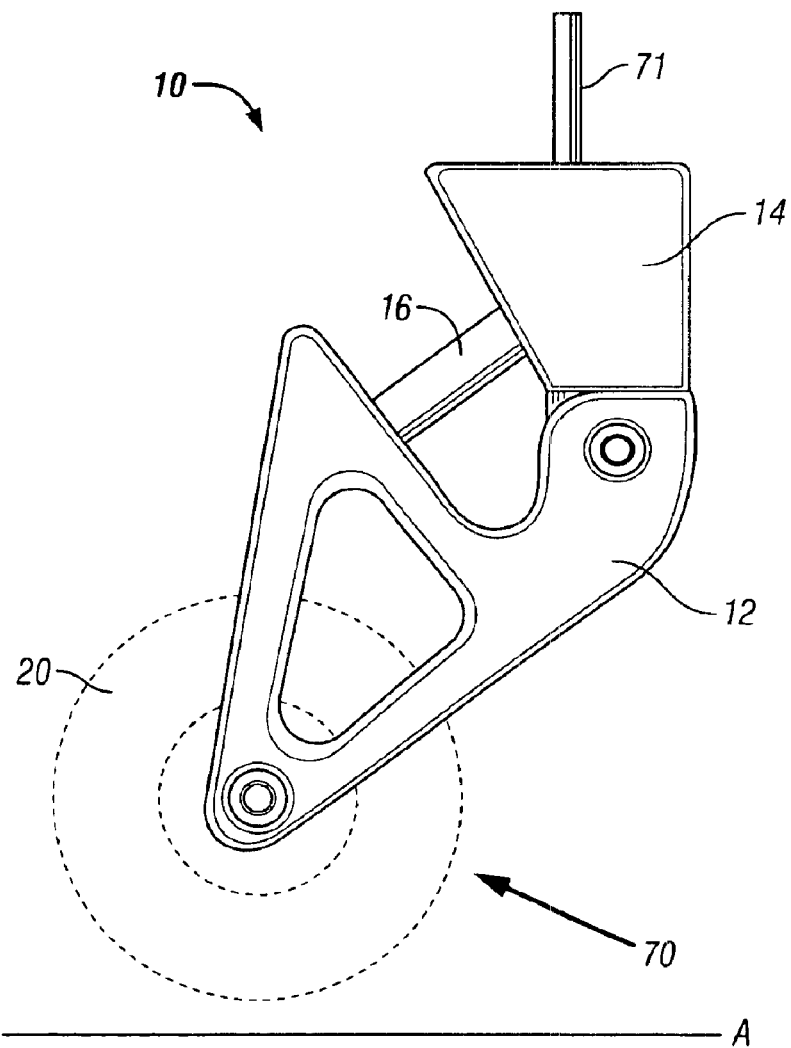
FIG. 4 is an assembled view of a first embodiment of a shock absorption mechanism according to the present invention, including a wheel (shown in phantom) installed thereon.
Figure 5:
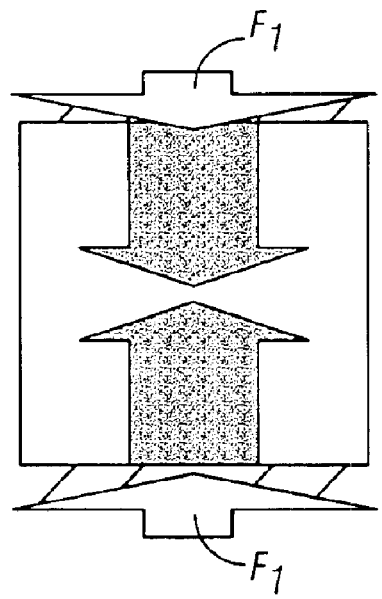
FIG. 5 is an illustrative diagram of stresses in the shock absorber according to the present invention.
Figure 7:
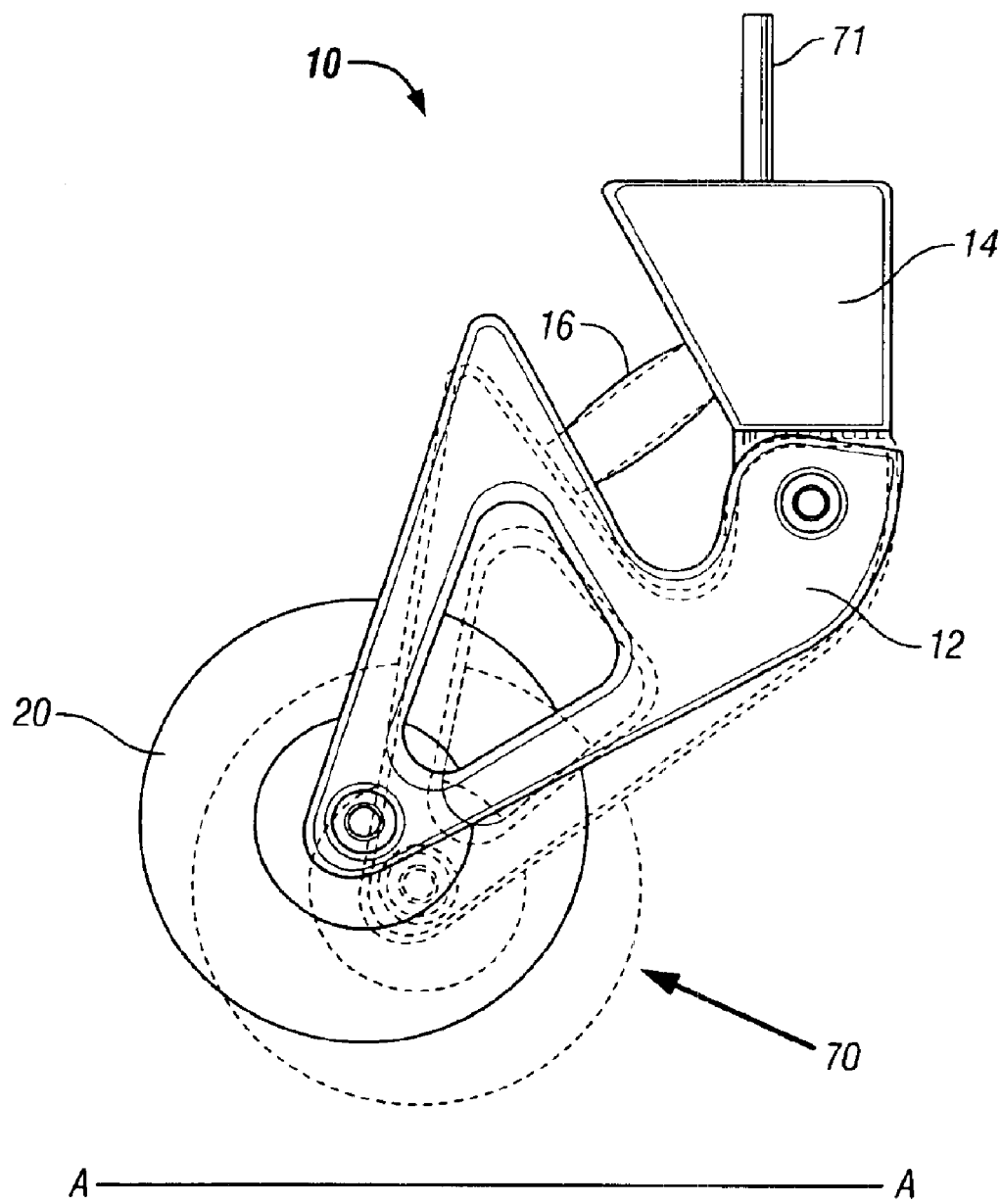
FIG. 7 is an exaggerated illustrative view of the shock absorber of FIG. 3, in a compressed configuration, wherein a first orientation of the shock absorption mechanism is illustrated in phantom, and a second rotated orientation of the shock absorption mechanism is illustrated in solid.

Referring to FIGS. 4, 5 and 7, stress distribution in the oblique shock absorber 16 of the present invention resulting from an oblique reaction force 70, illustrative of forces sustained during a double drum or curb drop test, is shown. As shown in FIG. 7, it can be seen that reaction force 70 causes caster fork 12 to pivot in a clockwise direction about pivot point 53. This pivoting action causes shock absorber 16 to predominately compress as a result of compressive forces $F_1$, imparted thereon by surfaces 26 and 56 of caster fork 12 and joint 14, respectively. Accordingly, virtually the entire reaction force 70, which includes both horizontal and vertical components, is dissipated along the axial length of shock absorber 16. Therefore, since polyurethane elastomers are most efficient at dissipating compressive forces, the oblique orientation of shock absorber 16, as shown in FIG. 4, provides maximum utilization of the shock absorption properties of shock absorber 16. It should be noted that the exaggerated compressed configuration of shock absorber 16 in FIG. 7 is shown for illustrative purposes only.

Figure 6:
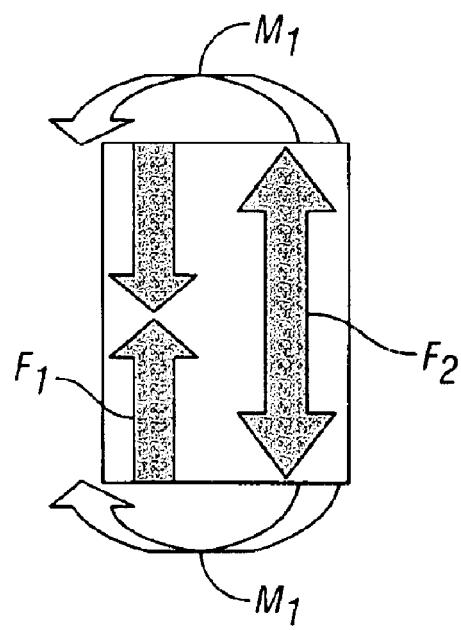
FIG. 6 is an illustrative diagram of stresses in a vertically oriented shock absorber.

Compared to the stress distribution illustrated in FIG. 5 for oblique shock absorber 16, referring to FIG. 6, stress distribution in a vertically oriented shock absorber (not shown) resulting from an oblique reaction a force such as force 70, is illustrated. It is apparent that since oblique reaction force 70 includes both horizontal and vertical components, a vertically mounted shock absorber will also include clockwise and counterclockwise bending moments $M_1$ and $M_2$, respectively, and tension and compressive forces $F_1$ and $F_2$, respectively. Bending moments $M_1$ and $M_2$ result from the inevitable rotation of the caster about a pivot. Compressive and tensile forces $F_1$ and $F_2$, respectively, result from the action of bending moments $M_1$ and $M_2$, respectively.

By comparing the stress distribution for a vertically mounted shock absorber, shown in FIG. 6, to the stress distribution for the oblique shock absorber 16 of the present invention, shown in FIG. 5, it has been determined herewith that shock absorber 16 dissipates the resultant forces from reaction force much more efficiently. Specifically, since shock absorber 16 is designed predominately for dissipating compressive forces, it has been determined herewith that a vertically mounted shock absorber would be virtually ineffective for dissipating predominately horizontal reaction forces. Thus, shock absorber 16 is preferably disposed in the oblique orientation illustrated in FIG. 4. It is foreseeable that compared to the orientation of FIG. 4, in which shock absorber 16 is disposed orthogonal to surfaces 26 and 56 of caster fork 12 and joint 14, respectively, shock absorber 16 may alternatively be disposed in an oblique configuration relative to surfaces 26 and 56, so long as both the horizontal and vertical components of a reaction force 70 can be efficiently dissipated.

An exemplary embodiment of shock absorption mechanism 10 will now be described.

Referring to FIGS. 1A–4, in an exemplary embodiment for shock absorption mechanism 10, caster fork 12 may employ a 3" diameter wheel 20 (although any diameter wheel is foreseeable). The body of caster fork 12 may be made of aluminum alloy 6016-T6. Shock absorber 16 may be made of a polyurethane elastomer having a predetermined stiffness. The stiffness may be based upon an evaluation of the following equation:

$$E=(F_e * L_i)/(A_c * \Delta L), \text{ where}$$

E is the elastomeric stiffness, $F_e$ is the load on the elastomer, $L_i$ is the initial length of the elastomer, $A_c$ is the cross-sectional area of the elastomer, and $\Delta L$ is the change of length of the elastomer after application of a load. Based upon the above-identified evaluation criteria, shock absorber 16 may be made of a polyurethane elastomer having a hardness of 60–80A, for example, for a conventional wheelchair having a 150 lb load.

A second embodiment of a shock absorption mechanism according to the present invention will now be described in detail.

Referring to FIGS. 8 and 9, the second embodiment of shock absorption mechanism, generally designated 80, is illustrated. Shock absorption mechanism 80 may generally include caster fork 82, joint 84, piston 86 disposed within cylinder 88 and wheel 90.

For shock absorption mechanism 80, caster fork 82 and joint 84 may be generally configured similar to caster fork 12 and joint 14 for shock absorption mechanism 10, illustrated in FIGS. 1A–4.

Specifically, referring to FIGS. 1A–1C and 8, caster fork 82 may generally be identical to caster fork 12, except that indentation 33 on caster fork 12 may be omitted for caster fork 82. Additionally, instead of generally flat surface 26, surface 92 of caster fork 82 may include a generally curved profile for facilitating engagement with piston 86.

Caster fork 82 may be constructed of rigid metals such as steel or aluminum, or may instead be constructed of plastic or ceramic materials of suitable rigidity.

Referring to FIGS. 2A–2C, 8 and 9, joint 84 may be generally configured similar to joint 14 for shock absorption mechanism 10. However, instead of indentation 72 (for joint 14), joint 84 may include a cylinder 88 within which piston 86 may be disposed. Cylinder 88 may include an internal diameter $D_5$ and a length $L_1$. Cylinder 88 may also be lined with a steel sleeve (not shown) for improving the durability and smoothness of piston movements therein. An air filler valve 89 may be connected to cylinder 88 via passage 93. Air filler valve 89 may be a conventional valve, such as a valve used for bicycles and the like. Accordingly, a conventional pump may be used to supply air through air filler valve 89 into cylinder 88, and a release pin (not shown) may be depressed within air filler valve 89 to release air as needed. Alternatively, it is apparent that a separate plug or cap may be provided for releasing air within cylinder 88. An air pressure gauge 91 may also be provided on joint 84 for displaying the air pressure within cylinder 88. Air pressure gauge 91 may be interlinked with cylinder 88 via passage 95.

As discussed above for joint 14, a rod 71 may be disposed within a threaded hole (not shown) on joint 84. Rod 71 may include a complementary threaded end for engagement with the threaded hole on joint 84. It is foreseeable that rod 71 may be formed with joint 84, instead of being separately affixed thereto, as would be apparent to a skilled artisan. Rod 71 may be inserted into a complementary receptacle (now shown) in a wheelchair to affix shock absorption mechanism 80 to the wheelchair.

Joint 84 may be constructed of rigid metals such as steel or aluminum, or may instead be constructed of plastic or ceramic materials of suitable rigidity.

Referring to FIGS. 8 and 9, piston 86 may include a generally circular section 94 having an external diameter $D_6$, a semicircular region 96 and an elongated region 98. The overall length of piston 86 may be $L_2$ and the length of elongated region 98 may be $L_3$. O-rings 102 may be provided at predetermined intervals along the length of elongated region 98 for creating an airtight seal. Although three o-rings 102 are illustrated in FIG. 9, it is foreseeable that one or several o-rings may be used to provide an airtight seal. A hollow section 104 may also be provided for allowing greater air capacity within piston 86.

Piston 86 may be constructed of a durable plastic such as DELRIN, or may be constructed of other materials, as would be apparent to a skilled artisan. Piston 86 may further include TEFLON impregnation.

For joint 84 and piston 86, external diameter $D_6$ of piston 86 may be slightly smaller than internal diameter $D_5$ of cylinder 88 so as to permit a tight fit of piston 86 (having o-rings 102 disposed thereon) within cylinder 88. Length $L_1$ of cylinder 88 may be slightly larger than elongated region 98 of piston 86, such that piston 86 may travel within cylinder 88. It is foreseeable that the relationship between the dimensions discussed above for joint 84 and piston 86 may be varied, as would be apparent to a skilled artisan.

In operation, piston 86, having o-rings 102 disposed thereon, may be inserted into cylinder 88 in joint 84. Thereafter, caster fork 82 may be assembled with joint 84 by means of a nut-bolt arrangement 106, for example. Air may then be pumped into cylinder 88 by means of a conventional air pump affixed to air filler valve 89. It is apparent that once air is filled within cylinder 88, piston 86 has a tendency to exit cylinder 88. This tendency to exit cylinder 88 is counteracted by surface 92 of caster fork 82. Moreover, it is apparent that as discussed above for shock absorption mechanism 10, the engagement of surface 108 of caster fork 82 to surface 110 of joint 84 prevents caster fork 82 from rotating in a counter-clockwise manner relative to the pivot point defined by nut-bolt arrangement 106, in the orientation illustrated in FIG. 8. Moreover, as discussed above for shock absorption mechanism 10, it can be seen that reaction force 70 causes caster fork 82 to pivot in a clockwise direction about the pivot point defined by nut-bolt arrangement 106. Additionally, reaction force 70 causes piston 86 to be pushed within cylinder 88, and compress the air therein, so as to absorb the impact of shock. Since the air pressure within cylinder 88 can be adjusted (i.e. increased or decreased) as needed, assembled shock absorption mechanism 80 may thereby facilitate specific "tuning" for specific users and specific shock absorption requirements.

In an exemplary configuration, air pressure within cylinder 88 may be adjustable within a range of 30–80 psi for specific users and specific shock absorption requirements. It is however foreseeable that air pressure within cylinder 88 may be adjustable to a broader pressure range for wheelchair applications, or for applications in other fields of endeavor.

For shock absorption mechanism 80 illustrated in FIGS. 8 and 9, it should be noted that instead of air, oil or other compressable fluids may be utilized singly or in combination for controlling the travel of piston 86. For example, oil may be used in conjunction with air to facilitate sliding and dampening of piston 86. If oil or other compressable fluids are used (instead of air), air filler valve 89 may be replaced by a valve for insertion of a compressable fluid within cylinder 88. Moreover, if oil or other compressable fluids are used, holes may be drilled adjacent hollow section 104, parallel to hollow section 104, for providing additional dampening.

Referring to FIG. 10, an alternative embodiment of piston 86 is disclosed. For piston 112, instead of having a semicircular region 96, piston 112 may have a roller 114 disposed thereon for permitting rolling contact with surface 92 of caster fork 82.

It should be emphasized that although wheelchair applications have been described above for shock absorption mechanisms 10 and 80 of the present invention, it is foreseeable that shock absorption mechanisms 10 and 80 could be used with, for example, both manual or powered wheelchairs, sport wheelchairs, gurneys (i.e. patient transport carts) and shock sensitive mobile equipment.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A shock absorption mechanism usable in a wheelchair, said mechanism comprising:
    a caster fork including a first oblique surface and a second surface, each of said surfaces being disposed at first and second angles, respectively, relative to a generally horizontal plane of travel of the wheelchair, a portion of said second surface including a generally curved profile, said caster fork being pivotable about a first axis;
    a joint mountable adjacent a first section thereof to a frame of the wheelchair and adjacent a second section thereof to said caster fork by means of a pivot connection having a pivoting axis substantially collinear with said first axis for enabling reciprocation of said caster fork about said first axis, said joint including a first oblique surface relative to the generally horizontal plane of travel of the wheelchair, and further including a second surface for guiding reciprocation of said generally curved profile portion of said caster fork about said first axis; and
    at least one shock absorber mountable at one end thereof to said first oblique surface of said caster fork and at the other end thereof to said first oblique surface of said joint, said shock absorber disposable in an oblique orientation relative to the generally horizontal plane of travel of the wheelchair,
    wherein, said caster fork is pivotable in a predetermined direction about said first axis adjacent said second section of said joint when mounted adjacent said second section of said joint, and said shock absorber is compressable in a direction generally parallel to said oblique orientation thereof during pivoting of said caster fork, when mounted between said first oblique surface of said caster fork and said first oblique surface of said joint.

2. A mechanism according to claim 1, wherein said first angle is greater than approximately 1° and less than approximately 89° relative to the generally horizontal plane of travel of the wheelchair.

3. A mechanism according to claim 1, wherein said second surface of said caster fork is disposed generally parallel relative to the generally horizontal plane of travel of the wheelchair.

4. A mechanism according to claim 1, wherein said second angle is greater than approximately 1° relative to the generally horizontal plane of travel of the wheelchair.

5. A mechanism according to claim 1, wherein when said caster fork is mounted to said joint, said first oblique surface of said caster fork is disposed generally parallel to said first oblique surface of said joint.

6. A mechanism according to claim 1, wherein when said shock absorber is mounted between said caster fork and said joint, said shock absorber is disposed generally orthogonal relative to said first oblique surface of said caster fork.

7. A mechanism according to claim 1, wherein when said shock absorber is mounted between said caster fork and said joint, said shock absorber is disposed at a predetermined angle relative to said first oblique surface of said caster fork.

8. A mechanism according to claim 1, wherein:
    said caster fork includes a first cutout therein for affixation of a wheelchair wheel, said first cutout being defined by two first mirror-image extensions, the wheelchair wheel being affixable between each of said first mirror-image extensions,
    said joint includes a protrusion for insertion within a second cutout in said caster fork, said second cutout being defined by two second mirror-image extensions, said protrusion of said joint being insertable between each of said second mirror-image extensions, and
    said shock absorber being retained within indentations provided on at least one of said first oblique surfaces of said caster fork and joint.

9. A mechanism according to claim 1, wherein said shock absorber is made of polyurethane elastomer.

10. A method of absorbing impact shocks for a wheelchair, said method comprising the steps of:
    providing a caster fork including a first oblique surface and a second surface, each of said surfaces being disposed at first and second angles, respectively, relative to a generally horizontal plane of travel of the wheelchair, a portion of said second surface including a generally curved profile, said caster fork being pivotable about a first axis;
    mounting a joint adjacent a first section thereof to a frame of the wheelchair and adjacent a second section thereof to said caster fork by means of a pivot connection having a pivoting axis substantially collinear with said first axis for enabling reciprocation of said caster fork about said first axis, said joint including a first oblique surface relative to the generally horizontal plane of travel of the wheelchair, and further including a second surface for guiding reciprocation of said generally curved profile portion of said caster fork about said first axis; and
    mounting at least one shock absorber, in an oblique orientation relative to the generally horizontal plane of travel of the wheelchair, at one end thereof to said first oblique surface of said caster fork and at the other end thereof to said first oblique surface of said joint,
    wherein, when said caster fork pivots about said first axis adjacent said second section of said joint, said shock absorber compresses in a direction generally parallel to said oblique orientation thereof.

11. A method according to claim 10, wherein said first angle is greater than approximately 1° and less than approximately 89° relative to the generally horizontal plane of travel of the wheelchair.

12. A method according to claim 10, wherein said second surface of said caster fork is disposed generally parallel relative to the generally horizontal plane of travel of the wheelchair.

13. A method according to claim 10, wherein said second angle is greater than approximately 1° relative to the generally horizontal plane of travel of the wheelchair.

14. A method according to claim 10, wherein said first oblique surface of said caster fork is disposed generally parallel to said first oblique surface of said joint.

15. A method according to claim 10, wherein said shock absorber is disposed generally orthogonal relative to said first oblique surface of said caster fork.

16. A method according to claim 10, wherein said shock absorber is disposed at a predetermined angle relative to said first oblique surface of said caster fork.

17. A method according to claim 10, further including the steps of:

providing a first cutout in said caster fork for affixation of a wheelchair wheel, said first cutout being defined by two first mirror-image extensions, the wheelchair wheel being affixable between each of said first mirror-image extensions;

providing a protrusion on said joint for insertion within a second cutout in said caster fork, said second cutout being defined by two second mirror-image extensions, said protrusion of said joint being insertable between each of said second mirror-image extensions; and providing indentations on at least one of said first oblique surfaces of said caster fork and said joint for retention of said shock absorber in said indentations.

18. A method according to claim 10, wherein said shock absorber is made of polyurethane elastomer.

19. A shock absorption mechanism usable in a wheelchair, said mechanism comprising:

a caster fork including a first generally oblique surface and a second surface, each of said surfaces being disposed at first and second angles, respectively, relative to a generally horizontal plane of travel of the wheelchair, a portion of said second surface including a generally curved profile, said caster fork being pivotable about a first axis;

a joint mountable adjacent a first section thereof to a frame of the wheelchair and adjacent a second section thereof to said caster fork by means of a pivot connection having a pivoting axis substantially collinear with said first axis for enabling reciprocation of said caster fork about said first axis, said joint including a first oblique surface relative to the generally horizontal plane of travel of the wheelchair, a second surface for guiding reciprocation of said generally curved profile portion of said caster fork about said first axis, and further including a cylinder having a central axis disposed generally orthogonal to said first oblique surface of said joint, said cylinder having a first open end and a second end having a passage for supplying air from an air filler valve to said cylinder; and a piston disposable within said cylinder, said piston having a first section disposed within said cylinder and a second exposed section protruding through said first open end of said cylinder and contacting said first generally oblique surface of said caster fork, said first section including at least one o-ring for providing sealing contact between said piston and said cylinder so as to prevent air from exiting said cylinder adjacent said piston, wherein, said caster fork is pivotable in a predetermined direction about said first axis adjacent said second section of said joint when mounted adjacent said second section of said joint, said piston is movable within said cylinder during pivoting of said caster fork when disposed within said cylinder and slidable along said first surface of said caster fork during reciprocation of said caster fork, and air pressure within said cylinder being adjustable to limit movement of said piston.

20. A mechanism according to claim 19, wherein said second section of said piston includes a roller mounted thereto, said roller being in one of rolling and sliding contact with said first generally oblique surface of said caster fork.

* * * * *